US009042733B2

(12) United States Patent
Yano et al.

(10) Patent No.: US 9,042,733 B2
(45) Date of Patent: May 26, 2015

(54) DEVICE IDENTIFICATION APPARATUS AND REMOTE CONTROL SYSTEM

(71) Applicant: Seiko Instruments Inc., Chiba-shi, Chiba (JP)

(72) Inventors: Hironori Yano, Chiba (JP); Fumiyasu Utsunomiya, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 31 days.

(21) Appl. No.: 13/785,475

(22) Filed: Mar. 5, 2013

(65) Prior Publication Data

US 2013/0251373 A1 Sep. 26, 2013

(30) Foreign Application Priority Data

Mar. 22, 2012 (JP) ................................ 2012-065982

(51) Int. Cl.
*G08C 23/04* (2006.01)
*H04B 10/114* (2013.01)

(52) U.S. Cl.
CPC ..................................... *G08C 23/04* (2013.01)

(58) Field of Classification Search
USPC ........................................................ 398/112
See application file for complete search history.

(56) References Cited

U.S. PATENT DOCUMENTS 6,507,725 B1 * 1/2003 Adams et al. ................ 399/388
6,594,494 B1 7/2003 Kakehi
8,233,803 B2 * 7/2012 Meyer et al. .................. 398/106
8,655,179 B2 * 2/2014 Al-Kadi et al. ............... 398/128
2005/0119770 A1 * 6/2005 Park et al. ........................ 700/65
2006/0013094 A1 * 1/2006 Miyake et al. ............... 369/53.2
2006/0159001 A1 7/2006 Imanishi
2008/0157840 A1 7/2008 Sperlich et al.
2009/0220243 A1 * 9/2009 Petricoin et al. .............. 398/106
2011/0031419 A1 * 2/2011 Fukui et al. ................... 250/574
2011/0193781 A1 * 8/2011 Utsunomiya ................. 345/166
2011/0217040 A1 9/2011 Mori
2011/0266889 A1 * 11/2011 Blohm .......................... 307/117
2012/0169482 A1 * 7/2012 Chen et al. ................. 340/12.52

FOREIGN PATENT DOCUMENTS

JP 07-123479 A 5/1995
JP 1995-123479 * 5/1995

OTHER PUBLICATIONS

Office Action for U.S. Appl. No. 13/784,149 dated Jul. 29, 2014, 10 pages.

* cited by examiner

*Primary Examiner* — David Payne
*Assistant Examiner* — Pranesh Barua
(74) *Attorney, Agent, or Firm* — Brinks Gilson & Lione

(57) ABSTRACT

The device identification apparatus includes: a remote controller signal detecting section for detecting an optical signal from a remote controller; a receiving section for receiving the optical signal from the remote controller; a signal decryption section for decrypting the optical signal received by the receiving section; and a transmitting section for transmitting a device identification signal when the optical signal is a device selecting signal, and configured such that operations of the receiving section, the signal decryption section, and the transmitting section are started in response to a detecting signal of the remote controller signal detecting section, thereby realizing a device identification apparatus in which power consumption during standby is minimized.

8 Claims, 4 Drawing Sheets

DEVICE IDENTIFICATION APPARATUS AND REMOTE CONTROL SYSTEM

RELATED APPLICATIONS

This application claims priority under 35 U.S.C. §119 to Japanese Patent Application No. 2012-065982 filed on Mar. 22, 2012, the entire content of which is hereby incorporated by reference.

BACKGROUND OF THE INVENTION

1. Field of the Invention

The present invention relates to a multi remote control system which is able to remotely control a plurality of electronic devices, and particularly to a device identification apparatus which requires less power consumption as compared with a conventional technique.

2. Background Art

In recent years, a lot of electronic devices which are operable by a remote controller have been widely used at home, and a plurality of remote controllers often exists in the same room. Therefore, when a desired device is intended to be operated by a remote controller, other remote controllers may interfere with the remote controller or it may take time to search for the remote controller.

In order to solve the problem, products such as a learning remote controller and a multi-remote controller only by which functions of a plurality of remote controllers are provided are commercially available.

However, they have such a problem that it is necessary to manually resister functions to be used in advance, which takes a lot of trouble, that only determined functions are usable and a remote control function of a new electronic device cannot be added, or that there are many buttons, which causes difficulty in operation.

In order to deal with that, such a technique is proposed that a device identification code signal is transmitted from a device identification apparatus provided in an electronic device so as to modify the remote controller to have a function to operate the device.

FIG. 5 is an internal block diagram of a conventional device identification apparatus. The device identification apparatus is constituted by a power supply section 501, an infrared receiving section 103, a signal decryption section 104, and an infrared transmitting section 105. The infrared receiving section 103 receives a device selecting signal from a remote controller via infrared, and passes a code signal included therein to the signal decryption section 104. The signal decryption section 104 decrypts a meaning of the code signal, and if it is a device selecting signal from the remote controller, the signal decryption section 104 requests the infrared transmitting section 105 to transmit a device identification code signal. The infrared transmitting section 105 transmits a device identification code signal to the remote controller via infrared. Here, the power supply section 501 constantly supplies power to the infrared receiving section 103, the signal decryption section 104, and the infrared transmitting section 105 (e.g., see Patent Document 1).

[Patent Document 1] Japanese Patent Application Laid-Open No. 7-123479

SUMMARY OF THE INVENTION

However, in the conventional device identification apparatus as described above, it is necessary for a reverse-connected photodiode or phototransistor to be used for infrared reception that a consumption current continuously flow therein so as to detect a change in an infrared light amount. Accordingly, in order to keep a state in which a device identification code signal from a remote controller is receivable at any time, the conventional device identification apparatus uses power during standby. Therefore, in a case where the device identification apparatus is driven by a battery, the device identification apparatus consumes the battery during standby, so that the battery should be changed frequently. This causes a remote control system to be hard to use.

The present invention is accomplished in view of the above problems, and proposes a convenient remote control system which requires less power consumption as compared with a conventional technique.

In order to solve the above problems, in a remote control system of the present invention, a device identification apparatus includes: a remote controller signal detecting section for detecting an optical signal from a remote controller; a receiving section for receiving the optical signal from the remote controller; a signal decryption section for decrypting the optical signal received by the receiving section; and a transmitting section for transmitting a device identification signal when the signal thus decrypted is a device selecting signal, and the device identification apparatus is configured such that operations of the receiving section, the signal decryption section, and the transmitting section are started in response to a detecting signal of the remote controller signal detecting section, thereby realizing a device identification apparatus in which power consumption during standby is minimized.

According to the present invention, the power consumption during standby of a device identification apparatus for detecting a signal from a remote controller is minimized, thereby making it possible to realize a device identification apparatus which requires less power consumption as compared with a conventional technique.

DETAILED DESCRIPTION OF THE PREFERRED EMBODIMENTS

A device identification apparatus has a function to receive a device selecting signal from a remote controller and to return a device identification code signal specific to the device identification apparatus.

Figure 1:
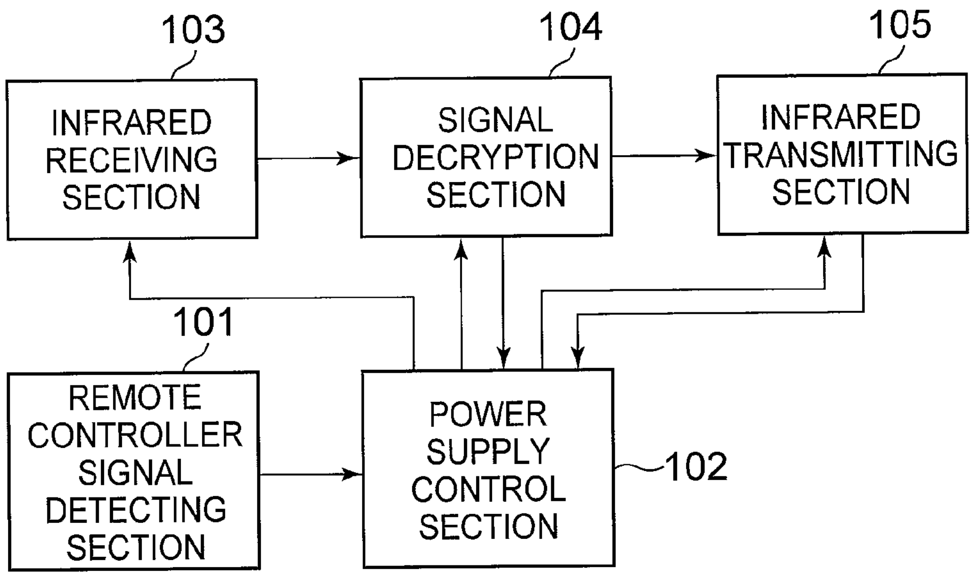
FIG. 1 is an internal block diagram of a device identification apparatus of the present embodiment.

FIG. 1 is an internal block diagram of a device identification apparatus of the present embodiment. The device identification apparatus in FIG. 1 is constituted by a remote controller signal detecting section 101, a power supply control section 102, an infrared receiving section 103, a signal decryption section 104, and an infrared transmitting section 105.

When detecting a sudden change of a light amount such as a remote controller signal, the remote controller signal detecting section 101 outputs a detecting signal indicative of detection of an infrared signal. The remote controller signal detecting section 101 receives the infrared signal by a photodiode and outputs a detecting signal of a remote controller signal by use of its power generation characteristic, and thus hardly uses power during standby except during a detection operation. The power supply control section 102 receives the detecting signal, and supplies power to the infrared receiving section 103, the signal decryption section 104, and the infrared transmitting section 105. The infrared receiving section 103 receives an infrared signal, and passes a code signal included therein to the signal decryption section 104. The signal decryption section 104 decrypts a meaning of the code signal, and if it is a device selecting signal from the remote controller, the signal decryption section 104 requests the infrared transmitting section 105 to transmit a device identification code signal. If the code signal is not a device selecting signal from the remote controller, the signal decryption section 104 requests the power supply control section 102 to stop application of power to the infrared receiving section 103, the signal decryption section 104, and the infrared transmitting section 105 so as to return them to an initial state. After the infrared transmitting section 105 transmits the device identification code signal, and the infrared transmitting section 105 requests the power supply control section 102 to stop application of power to the infrared receiving section 103, the signal decryption section 104, and the infrared transmitting section 105 so as to return them into the initial state.

As described above, the device identification apparatus is configured such that the remote controller signal detecting section 101 which hardly uses power during standby monitors an infrared signal; only when the infrared signal is detected, the power supply control section 102 supplies power to the infrared receiving section 103, the signal decryption section 104, and the infrared transmitting section 105; and only when the received infrared signal is a device selecting signal from the remote controller, a device identification code signal is returned. As a result, it is possible to perform infrared communication with the remote controller only when necessary without using much power during standby.

In a case where the remote controller signal detecting section detects an infrared signal and transmits a device identification code signal without decrypting a code signal thereof, when electronic devices including device identification apparatuses attached thereto are provided at a short distances, such an operation is repeated that: one device identification apparatus sends back a device identification code signal in response to the device selecting signal from the remote controller; another device identification apparatus receives the device identification code signal and sends back another device identification code signal because the another device identification apparatus cannot distinguish the device identification code signal from the device selecting signal transmitted from the remote controller; and further, the first device identification apparatus reacts to the another device identification code signal. If this phenomenon occurs, it is difficult to perform appropriate infrared communication, and further, the device identification apparatuses consume power wastefully. According to the present invention, in order to prevent the phenomenon, a device identification apparatus is provided with an infrared receiving section and a signal decryption section other than a remote controller signal detecting section and an infrared transmitting section, and is configured such that after the remote controller signal detecting section has detected an infrared signal, the infrared receiving section and the signal decryption section read code information of the infrared signal, and only when the infrared signal is a device selecting signal from the remote controller, the device identification apparatus transmits a device identification code signal. Further, upon receiving a detecting signal from the remote controller signal detecting section, power is supplied to the infrared receiving section, the signal decryption section, and the infrared transmitting section, so that power consumption during standby of the device identification apparatus is largely reduced in comparison with a conventional system.

The remote controller signal detection circuit works with visible rays as well as infrared rays, so that transmission of a device selecting signal may be performed with visible rays instead of infrared rays.

The photodiode to be used for detection of a remote controller signal may double as a photodiode to be used for reception of a remote controller signal. Further, these photodiodes and an infrared LED for transmission of a device identification code signal may double as the photodiode for detection of a remote controller signal.

The device identification apparatus may be driven by a battery, or may be configured such that the device identification apparatus is provided in a household appliance and uses a power supply section commonly with the household appliance or electric power is charged in a charge section such as a large-capacity capacitor or a secondary battery for a power source of the device identification apparatus from a power source for a household appliance at the time when the household appliance is operated.

In a case where the device identification apparatus is provided in a household appliance, the infrared signal receiving section of the device identification apparatus can double as an infrared signal receiving section for the household appliance. Further, by controlling a power source of the electronic device itself after detection of the remote controller signal, it is also possible to reduce standby power consumption of the electronic device itself.

A device identification code signal is specific to the device identification apparatus. It is conceivable that the device identification code signal may be set in advance, set by a switch, or set by communication with a PC or the like.

Figure 2:
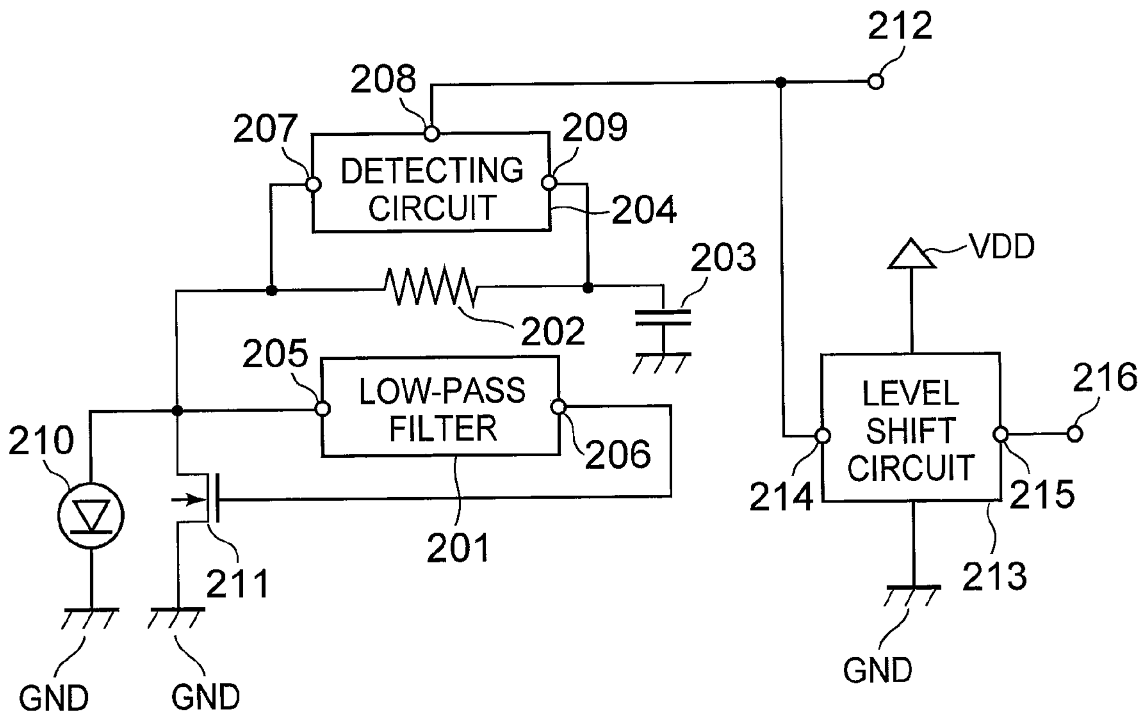
FIG. 2 is an example of a schematic circuit diagram of a remote controller signal detection circuit in the device identification apparatus of the present embodiment.

FIG. 2 illustrates an example of a schematic circuit diagram of the remote controller signal detection circuit. The remote controller signal detection circuit of FIG. 2 includes a photodiode 210, an NMOS transistor 211, a low-pass filter 201, a resistance element 202, a capacitance element 203, a detecting circuit 204, an output terminal 212, a level shift circuit (an LS circuit) 213, and a CMOS level signal output terminal 216.

The photodiode 210 is configured such that: an N-type terminal is connected to a GND terminal; and a P-type terminal is connected to a drain of the NMOS transistor 211, an input terminal 205 of the low-pass filter 201, a side terminal of the resistance element 202, and a first input terminal 207 of the detecting circuit 204. The low-pass filter 201 is configured such that an output terminal 206 is connected to a gate of the NMOS transistor 211. The NMOS transistor 211 is configured such that a source is connected to a GND terminal. The resistance element 202 is configured such that another side terminal other than the side terminal connected to the P-type terminal of the photodiode 210 is connected to a side terminal of the capacitance element 203 and a second input terminal 209 of the detecting circuit 204. The capacitance element 203 is configured such that another side terminal other than the side terminal connected to the another side terminal of the resistance element 202 is connected to a GND terminal. The detecting circuit 204 is configured such that a delayed signal output terminal 208 is connected to the output terminal 212 and an input terminal 214 of the level shift circuit 213. The level shift circuit 213 is configured such that an output terminal 215 is connected to the CMOS level signal output terminal 216. Note that, although not illustrated in the figure, a positive voltage is supplied to a VDD terminal from a power source, and a reference voltage is supplied to a GND terminal from the power source.

The photodiode 210 supplies a current according to an amount of light to be incident thereon due to a photoelectric conversion characteristic. The NMOS transistor 211 flows a current from the photodiode 210 from its drain to its source. The low-pass filter 201 outputs, to the output terminal 206, only a DC component of a drain voltage of the NMOS transistor 211 input from the input terminal 205. The resistance element 202 constitutes a low-pass filter together with the capacitance element 203, and this low-pass filter is able to pass therethrough an AC component having a frequency higher than that of the low-pass filter 201. The detecting circuit 204 detects a voltage occurring between both terminals of the resistance element 202 by means of the first input terminal 207 and the second input terminal 209, and outputs a detection result thereof from the delayed signal output terminal 208. Then, the level shift circuit 213 converts a signal input from the input terminal 214 into a CMOS level signal, and outputs this converted CMOS level signal from the output terminal 215.

Note that the signal output from the delayed signal output terminal 208 of the detecting circuit 204 is as follows: when the voltage at both terminals of the resistance element 202 is less than a predetermined level, a low-level signal of a GND terminal voltage is output; and when the voltage is not less than the predetermined level, a power generation voltage of the photodiode 210, which is a drain voltage of the NMOS transistor 211, is output.

The remote controller signal detection circuit configured as described above works in the following manner to detect a change in an incident light amount.

Initially, the following describes an operation in a case where it is dark around. Since a regular current does not flow into the photodiode 210, the drain of the NMOS transistor 211 substantially becomes a GND terminal voltage. Therefore, the input terminal 205 of the low-pass filter 201 substantially becomes the GND terminal voltage. Accordingly, the gate of the NMOS transistor 211 substantially serves as a GND terminal, and the NMOS transistor 211 is turned off. Further, since the drain of the NMOS transistor 211 substantially becomes the GND terminal voltage, a low-level signal of the GND terminal voltage is output from the delayed signal output terminal 208 of the detecting circuit 204 regardless of a detection condition. Accordingly, the low-level signal of the GND terminal voltage is output to the output terminal 212, and thus, a high-level signal of a VDD terminal voltage is output to the CMOS level signal output terminal 216.

When an optical signal is input or it becomes bright suddenly from a state where it is dark around and a current from the photodiode 210 flows out suddenly, a drain voltage of the NMOS transistor 211 increases until a current flowing into the NMOS transistor 211 increases to the current from the photodiode 210. During a period in which the drain voltage of the NMOS transistor 211 is increasing, a voltage occurs between both terminals of the resistance element 202, and therefore, the detecting circuit 204 judges that a voltage of a predetermined level or more occurs between the both terminals of the resistance element 202. Accordingly, a power generation voltage of the photodiode 210, which is a drain voltage of the NMOS transistor 211, is output to the delayed signal output terminal 208 of the detecting circuit 204. Therefore, during the period, the output terminal 212 becomes a power generation voltage of the photodiode 210, which is the drain voltage of the NMOS transistor 211, and outputs a low-level signal of the GND terminal voltage to the CMOS level signal output terminal 216.

Next will be described an operation in a case where it is bright around. Since a regular current flows into the photodiode 210, the drain of the NMOS transistor 211 is controlled at a voltage which is slightly higher than a threshold value of the NMOS transistor 211. Further in this case, since the drain voltage of the NMOS transistor 211 does not change, no voltage occurs between both terminals of the resistance element 202. Accordingly, the detecting circuit 204 judges that the voltage between the both terminals of the resistance element 202 is less than the predetermined level, and outputs a low-level signal of the GND terminal voltage to the delayed signal output terminal 208. Thus, during the period, the output terminal 212 becomes the low-level signal of the GND terminal voltage and outputs a high-level signal of the VDD terminal voltage to the CMOS level signal output terminal 216.

When an optical signal is input or it becomes brighter from a state where it is bright around and a current from the photodiode 210 increases suddenly, the drain voltage of the NMOS transistor 211 increases until the current flowing into the NMOS transistor 211 increases to the current in the photodiode 210. During a period in which the drain voltage of the NMOS transistor 211 is increasing, a voltage occurs between both terminals of the resistance element 202, and thus, the detecting circuit 204 judges that a voltage of a predetermined level or more occurs between the both terminals of the resistance element 202. Accordingly, a power generation voltage of the photodiode 210, which is a drain voltage of the NMOS transistor 211, is output to the delayed signal output terminal 208 of the detecting circuit 204. Thus, during the period, the output terminal 212 becomes a power generation voltage of the photodiode 210, which is the drain voltage of the NMOS transistor 211, and outputs a low-level signal of the GND terminal voltage to the CMOS level signal output terminal 216.

Note that when time passes for a while after an optical signal is input or it becomes bright suddenly, the capacitance element 203 is charged through the resistance element 202. This causes the voltage occurring between both terminals of the resistance element 202 to decrease, and no voltage occurs before long. Then, needless to say, when time further passes, the NMOS transistor 211 is able to flow an increasing amount of the current of the photodiode 210 which has increased suddenly, and therefore, the state returns back to the state before the optical signal is input or it becomes bright suddenly.

Further, it goes without saying that in a case where an optical signal is input or it becomes brighter and the drain voltage of the NMOS transistor 211 increases to a level of the VDD terminal voltage, a signal of the output terminal 212 becomes a CMOS level signal, so that the level shift circuit becomes unnecessary.

The remote controller signal detection circuit of FIG. 2 is configured to detect a voltage difference between both terminals of the resistance element 202 of the low-pass filter constituted by the resistance element 202 and the capacitance element 203. Further, the remote controller signal detection circuit of FIG. 2 is configured such that the frequency which the low-pass filter constituted by the resistance element 202 and the capacitance element 203 is able to pass through is higher than the frequency which the low-pass filter 201 is able to pass through. A slow voltage change of the frequency due to a light amount change caused when someone crosses the remote controller signal detection circuit, someone's hand comes closer to the remote controller signal detection circuit, or a curtain swings by wind can be passed through the low-pass filter constituted by the resistance element 202 and the capacitance element 203.

According to the configuration, it is possible to have a feature that a certain light amount change is able to be detected regardless of surrounding brightness. That is, it is possible to have such a feature that the light amount change caused when someone crosses the remote controller signal detection circuit, someone's hand comes closer to the remote controller signal detection circuit, or a curtain swings by wind is not detected, and a certain light amount change is detectable even if surrounding brightness changes.

Since a part which detects light of the remote controller signal detection circuit of FIG. 2 detects the light by a power generation current of the photodiode to be used as an optical sensor, the part does not consume a current at all during standby unlike a general optical sensor. Further, even in a case where there is no change in an incident light amount in the level shift circuit, since a GND terminal voltage is input into the input terminal, no consumption current is used at all. On that account, the remote controller signal detection circuit of FIG. 2 is able to detect a rapid increase in light without using power during standby.

However, differently from a receiving circuit using a reverse-connected photodiode or phototransistor to be used in general infrared reception, the remote controller signal detection circuit of FIG. 2 is configured such that its output does not change according to an infrared signal with high-speed change which changes at an infrared carrier frequency. The reason is as follows: when a change in a light amount is viewed based on a power generation current of the photodiode, a parasitic capacitance occurring between an anode and a cathode becomes large, and therefore, a reaction to the change in a light amount becomes slower than a general receiving circuit.

For this reason, the remote controller signal detection circuit is able to detect incidence of a signal of 38 kHz which is a carrier frequency of an infrared signal of a general remote controller, but is not able to read a code included in the signal.

In view of this, it is necessary to provide, in the device identification apparatus, a circuit for reading a code signal included in an infrared signal separately from the remote controller signal detection circuit. In addition, such a method is conceivable that a carrier frequency of a device selecting signal of the remote controller is decreased to a speed at which the remote controller signal detection circuit is able to follow.

A household appliance and a toy for home use which are remotely controllable by an infrared remote controller, a plurality of electronic devices which are operated by a single terminal for business use, and the like are assumed herein.

Further, the remote control system of the present embodiment is usable even in an electronic device which performs control not only by infrared but also by radio. Even in a case of the electronic device which performs control by radio, infrared communication is used from a remote controller to a device identification apparatus, and therefore, it is possible to select a function of the remote controller toward the electronic device.

Figure 3:
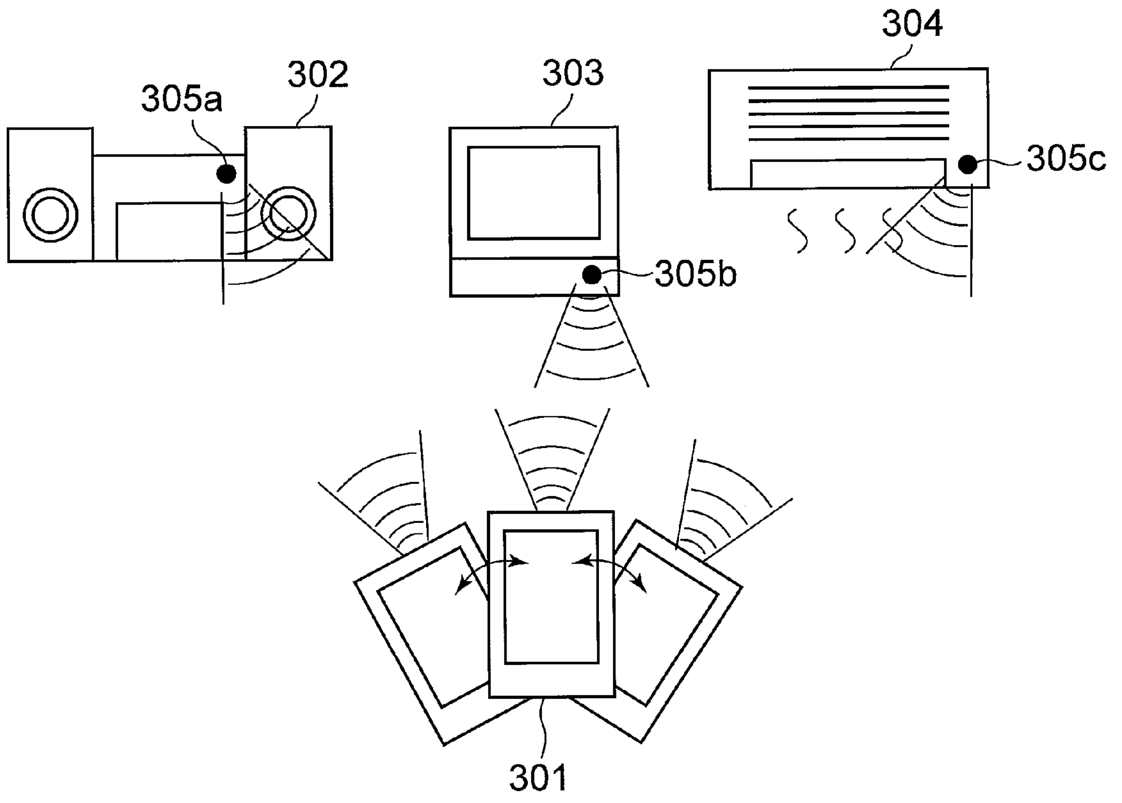
FIG. 3 is an exemplary implementation environment of the present embodiment.

FIG. 3 is an exemplary implementation environment of the remote control system of the present embodiment. In FIG. 3, a reference sign 301 indicates a remote controller, and reference sings 302, 303, and 304 indicate electronic devices operable by the remote controller.

In this example, a smartphone having an infrared transmission and reception function is assumed as the remote controller 301, but the remote controller 301 may be other terminals having an infrared transmission and reception function. Further, a stereo component 302, a television 303, and an air conditioner 304 are assumed as the electronic devices operated by an infrared remote controller, which electronic devices are taken as an operation target of the remote controller 301, but they may be other electronic devices which are remotely controlled by infrared signals.

A device identification apparatus 305 is attached to each of the electronic devices at a position where an infrared signal from the remote controller 301 is easily received.

The device identification apparatus 305 has a role to perform infrared communication with the remote controller 301 so as to cause the remote controller to identify which electronic device the device identification apparatus 305 is attached to.

When a user directs the remote controller 301 to a target electronic device which the user wants to operate and presses a select button on the remote controller 301, a screen of the remote controller 301 is changed into an interface to operate the target electronic device for the operation, and thus, the user is able to remotely control the target electronic device for the operation.

For example, it is assumed that an interface to operate the television 303 is displayed on the remote controller 301 first. In a case where the user wants to operate the air conditioner 304, the user directs the remote controller 301 to the air conditioner 304 and presses a select button on the remote controller 301. Then, a display on the remote controller 301 is changed into an interface to operate the air conditioner 304, and thus the remote controller 301 is turned into a state where the remote controller 301 is able to remotely control the air conditioner 304. Its subsequent operation is as follows: by pressing an operation button on a touch panel, the user is able to remotely control the electronic device via the remote controller 301 in a similar manner to a general infrared remote controller.

The aforementioned exemplary implementation environment is the same as the conventional remote control system, but in the present invention, power consumption in the device identification apparatus 305 during standby to wait for a device selecting signal from the remote controller is restrained to minimum requirement, thereby making it possible to realize a remote control system with low power consumption.

Figure 4:
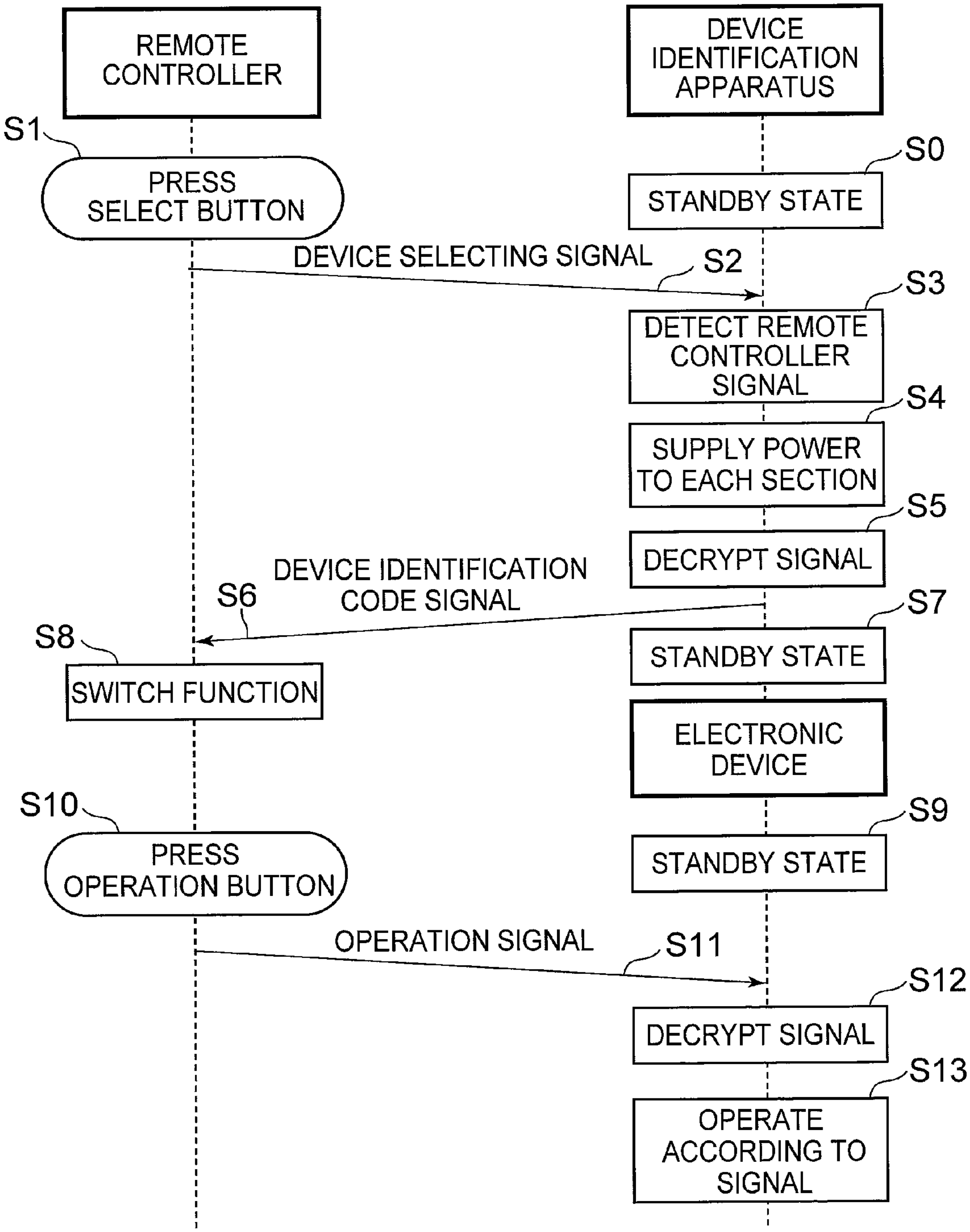
FIG. 4 is an operation flow of a remote control system of the present embodiment.
Figure 5:
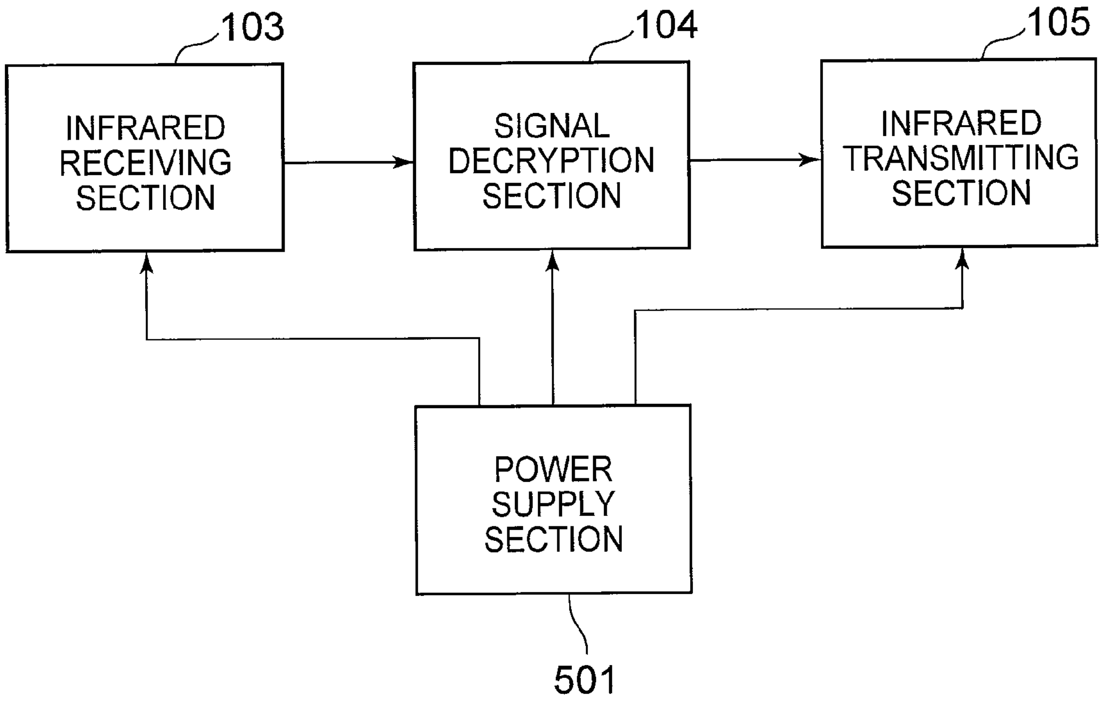
FIG. 5 PRIOR ART
FIG. 5 is an internal block diagram of a conventional device identification apparatus.

FIG. 4 is an operation flow of the remote control system of the present embodiment. In FIG. 4, each operation is performed sequentially from the top.

The following describes a flow of an operation from selection of an electronic device as a target to be operated by the remote controller to perform the operation.

In an initial state, the device identification apparatus is in a standby state in which the device identification apparatus hardly uses power (SO).

The remote controller is directed toward an operation target to which a device identification apparatus is attached, and then, a "select" button is pressed (S1).

A selecting signal is transmitted via infrared from the remote controller (S2).

When transmitting the selecting signal, the remote controller enters a waiting state of reception of an identification signal.

When the device identification apparatus receives the infrared signal from the remote controller, a remote controller signal detection circuit thereof reacts by the infrared signal (S3), and a power supply control section supplies power to an infrared receiving section, a signal decryption section, and an infrared transmitting section (S4).

An activated remote controller signal receiving section decrypts a code of the infrared signal from the remote controller (S5), and if it is a device selecting signal, the remote controller signal receiving section finishes a receiving process.

If the code of the infrared signal is not a device selecting signal, the signal decryption section stops application of power to the remote controller signal receiving section through the power supply control section and returns to the initial state (in this case, transmission (S6) of a device identification code signal is not performed and the operation proceeds to a standby state (S7)).

After that, the device identification apparatus transmits a device identification signal indicative of a household appliance to which the device identification apparatus itself is attached via infrared toward the remote controller (S6).

When the device identification apparatus transmits a device identification code signal, the device identification apparatus stops application of power to the remote controller signal receiving section and returns to the initial state (S7).

When the remote controller receives the device identification code signal from the device identification apparatus, in order to change itself into a function corresponding to the device identification code signal, the remote controller displays an interface corresponding to the device on a screen or changes a function of the button (S8).

After that, by operating the remote controller, it is possible to remotely control the operation target in a similar manner to a general infrared remote controller (S9 to S11).

In the standby state in S0 and S7, in the device identification apparatus, the infrared receiving section, the signal decryption section, and the infrared transmitting section are shut off by the power supply control section and the remote controller signal detecting section hardly uses power in the standby state, so that the device identification apparatus hardly uses power as a whole.

In a case where a plurality of device identification apparatuses receives a device selecting signal from the remote controller at the same time, if the device identification apparatuses transmit device identification code signals at the same time, infrared signals from the plurality of device identification apparatuses interfere with each other, so that the remote controller is not able to receive the infrared signals appropriately. In order to prevent this, such a method is effective that a delay time specific to a device identification apparatus is set in the device identification apparatus after receiving a device selecting signal from a remote controller but before transmitting a device identification code signal so that a plurality of device identification apparatuses does not transmit a device identification code signal at the same time. However, in a case where a time when the device selecting signal from the remote controller reaches each device identification apparatus offsets the delay time, the device identification code signals are eventually transmitted at the same time. In order to prevent this, an interval of time at which a device selecting signal is transmitted from the remote controller should be at least longer than a maximum value of a delay time per device identification apparatus.

Further, in a case where a plurality of device identification apparatuses comes up as a candidate, it is also possible to preferentially select an electronic device which has received a selecting signal from the remote controller more strongly. To that end, the following method is effective, for example: the device identification apparatus is configured to transmit a device identification code signal with a change in a delay time which is smaller than an interval between delay times of respective device identification apparatuses according to an intensity of a received remote controller signal, and the remote controller calculates the delay times and gives priority to an electronic device which has received a remote controller signal with a highest intensity; or the remote controller reads intensities of the device identification code signals transmitted from the device identification apparatuses, and gives priority to an electronic device of a device identification code signal with a highest intensity.

As described above, since a device identification apparatus using a remote controller signal detection circuit is configured to transmit a device identification code signal only when receiving a selecting signal from a remote controller, it is possible to provide a convenient remote control system of which power consumption during standby is restrained to minimum requirement. Further, it goes without saying that this remote control system is not limited to remote control of an electronic device, but also is usable for a system in which information is exchanged between electronic devices by use of an optical signal by detecting whether or not there is a signal by use of power generation by the optical signal.

What is claimed is:

1. A device identification apparatus for transmitting a device identification signal for identifying a corresponding device to a remote controller for storing and transmitting codes to control various devices, the device identification apparatus comprising:

a remote controller signal detecting section for detecting an light signal from the remote controller, the detecting section comprising a photo-electronic conversion diode that detects the light signal from the remote controller and generates current corresponding to an amount of incidental light, wherein an N-type terminal of the diode is connected to a ground terminal;

a receiving section for receiving an optical signal from the remote controller;

a signal decryption section for decrypting the signal thus received by the receiving section; and a transmitting section for transmitting a device identification signal when the signal thus decrypted is a device selecting signal, wherein the receiving section, the signal decryption section, and the transmitting section are turned from an off-state, in which no power is consumed, to an on-state in response to a detecting signal of the remote controller signal detecting section.

2. The device identification apparatus according to claim 1, wherein the remote controller signal detecting section further comprises an MOS transistor in which the current from the photoelectric conversion diode is supplied to a drain thereof; and a low-pass filter controls a gate voltage of the MOS transistor so that a drain voltage of the MOS transistor becomes a desired voltage.

3. The device identification apparatus according to claim 2, wherein the low pass filter comprises first and second low pass filters, wherein the second low-pass filter comprises a resistor coupled to a capacitor.

4. The device identification apparatus according to claim 3, wherein the second low pass filter passes a higher frequency than the first low pass filter.

5. The device identification apparatus according to claim 2, wherein a terminal of the resistor is connected to the drain of the MOS transistor.

6. The device identification apparatus according to claim 1, wherein the remote controller signal detecting section includes first and second low pass filters connected to the photoelectric conversion diode, the first and second low pass filters having different frequency responses.

7. The device identification apparatus according to claim 6, wherein the signal decryption section, and the transmitting section are turned from an off-state, to an on-state by an increase in voltage from a ground signal through the first and second low pass filters in response to a detecting signal of the photoelectric conversion diode.

8. A remote control system comprising:

a remote controller for storing and transmitting codes to control various devices; and the device identification apparatus according to claim 1 for transmitting a device identification signal to identify a corresponding device to the remote controller.

* * * * *